May 11, 1954     E. T. PETERSON     2,677,979
END ROLL ADJUSTMENT

Filed July 18, 1951     3 Sheets-Sheet 1

INVENTOR
*Edward T. Peterson.*
BY
ATTORNEYS.

May 11, 1954

E. T. PETERSON 2,677,979

END ROLL ADJUSTMENT

Filed July 18, 1951

INVENTOR
Edward T. Peterson.
BY
ATTORNEYS.

May 11, 1954   E. T. PETERSON   2,677,979
END ROLL ADJUSTMENT
Filed July 18, 1951   3 Sheets-Sheet 3
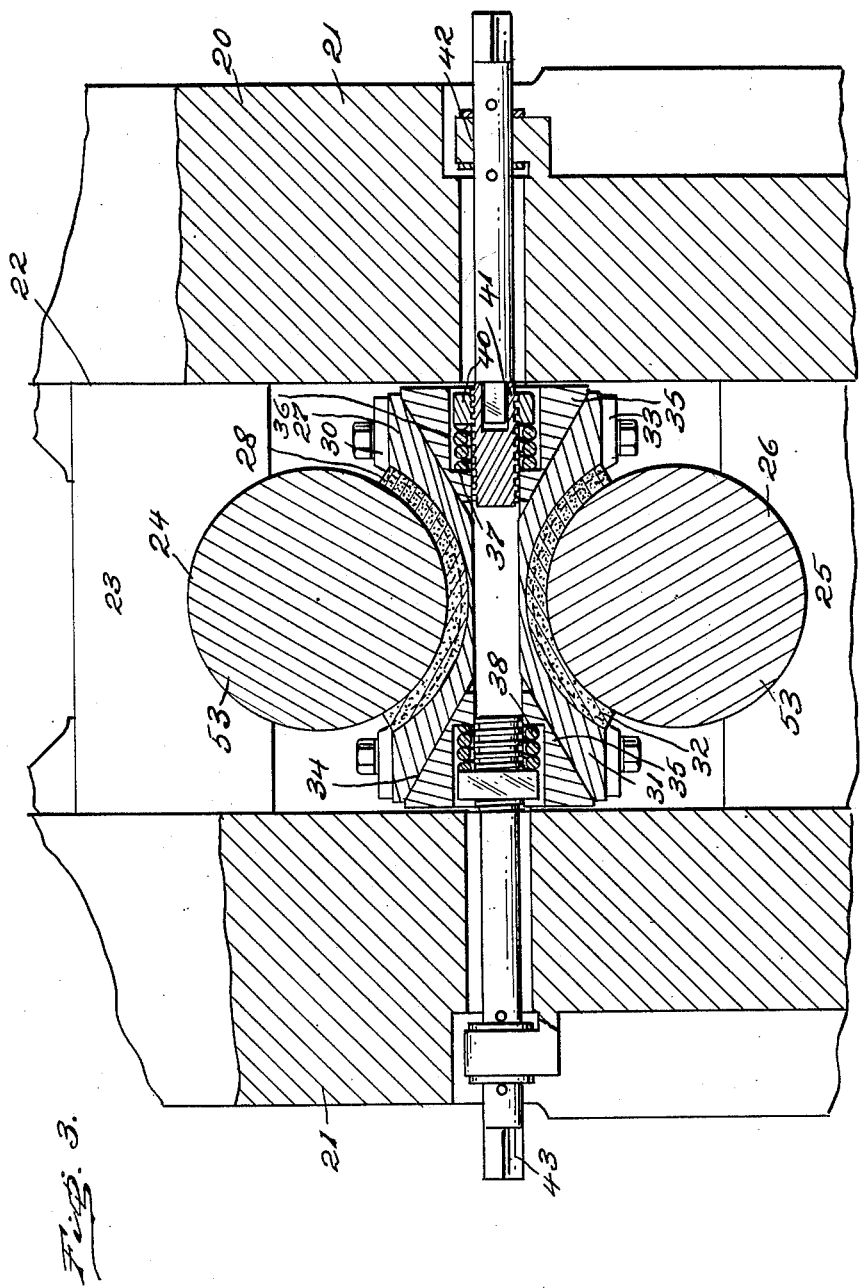
Fig. 3.
INVENTOR
Edward T. Peterson.
BY
ATTORNEYS.

Patented May 11, 1954

2,677,979

UNITED STATES PATENT OFFICE 2,677,979

END ROLL ADJUSTMENT

Edward T. Peterson, Reading, Pa., assignor to Birdsboro Steel Foundry and Machine Company, Birdsboro, Pa., a corporation of Pennsylvania Application July 18, 1951, Serial No. 237,402

5 Claims. (Cl. 80—56)

The present invention relates to end roll adjustments for metal rolling mills.

A purpose of the invention is to avoid damage to the thrust bearing assembly by the adjustment yoke and permit more accurate axial positioning of the adjustment yoke.

A further purpose is to permit access to the means for holding the thrust bearings on the roll without removing the thrust bearing grease, so that the tightening means can be tightened up periodically without changing the lubrication.

A further purpose is to permit more accurate measuring of the adjustment by observing the angular movement of one or more of the adjustment nuts by placing dial indications on one of the nuts.

Further purposes appear in the specification and in the claims.

In the drawings I have chosen to illustrate one only of the numerous embodiments in which my invention may appear, selecting the form shown from the standpoints of convenience in illustration, satisfactory operation and clear demonstration of the principles involved.

Figure 3 is a section on the line 3—3 of Figure 2, the upper roll upper chuck and the lower roll lower chuck being merely shown conventionally and not sectioned.

Figure 4 is an enlarged fragment of Figure 2.

Figure 1:
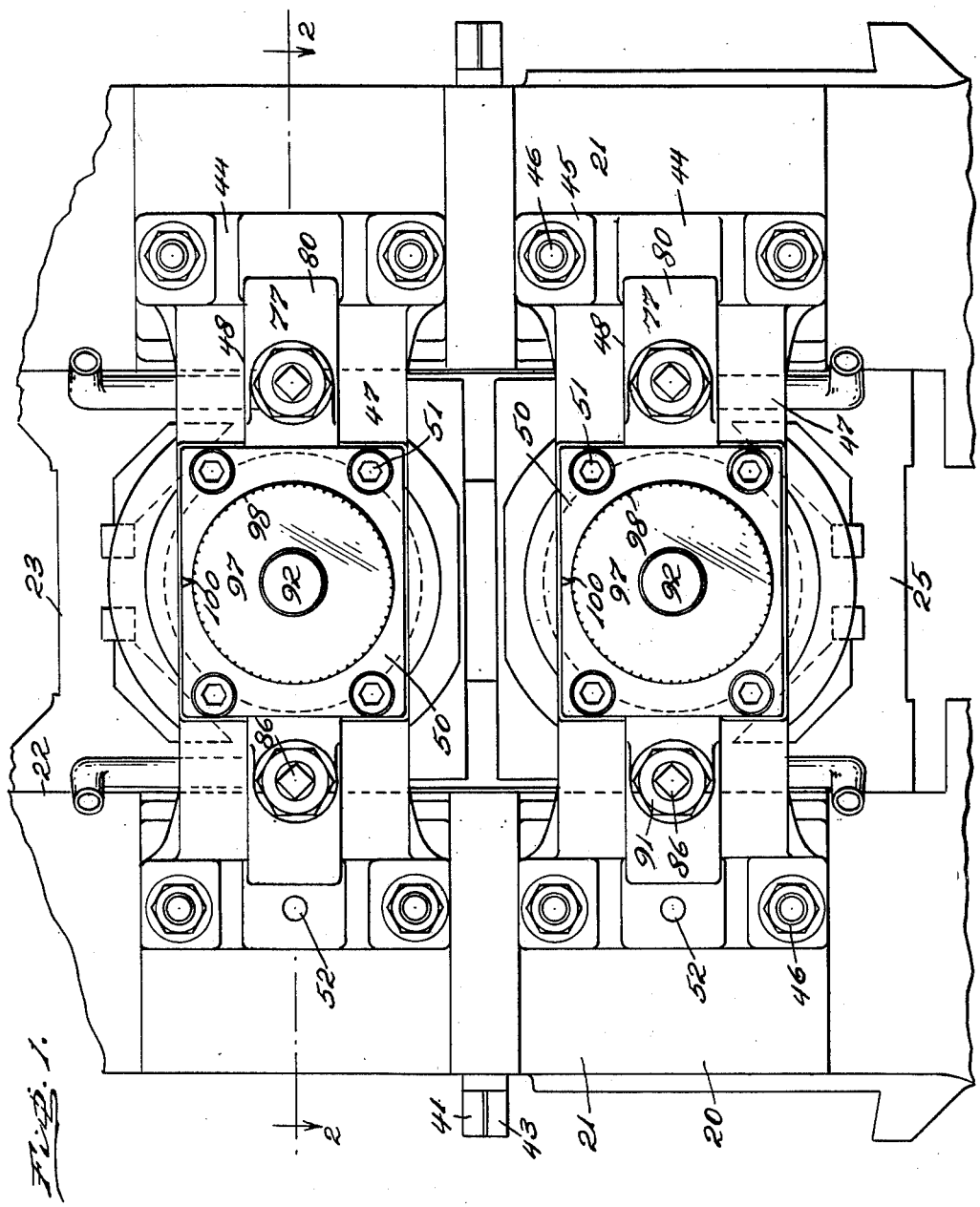
Figure 1 is a fragmentary end view of a rolling mill to which the invention has been applied.
Figure 2:
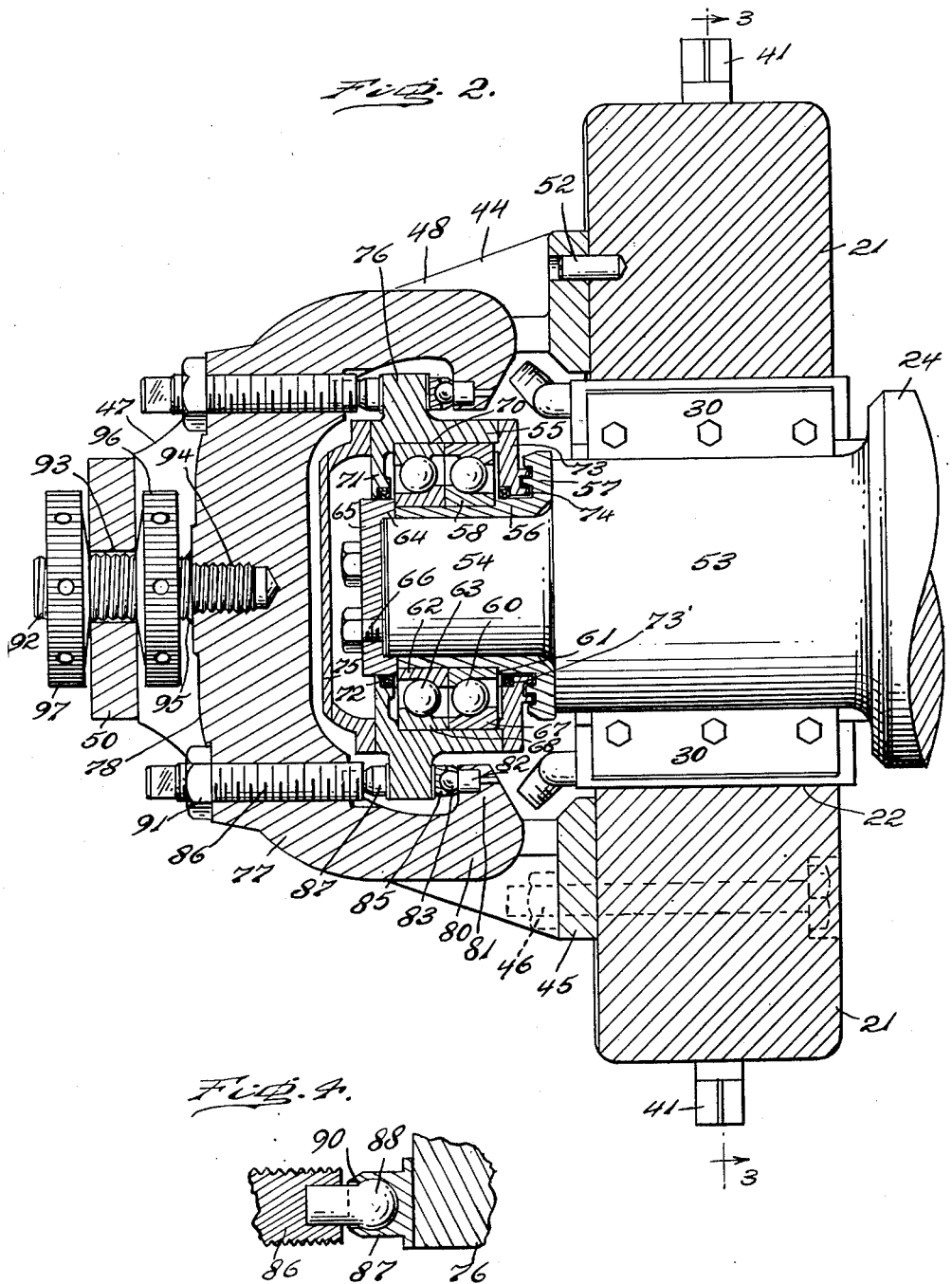
Figure 2 is a sectional plan on the line 2—2 of Figure 1.

Describing in illustration but not in limitation and referring to the drawings:

The present application constitutes a further development of the subject matter of my application Serial No. 20,287, filed April 10, 1948, now Patent No. 2,651,956 issued September 15, 1953, for End Roll Adjustment.

Efforts were made in the device of the prior application to obtain point contact of the clamps on the adjustment yoke with the thrust bearing assembly. This is difficult to obtain and is likely to wear and mar the cooperating parts. In accordance with the present invention universal joint mounting has been provided both for the clamping anvil and desirably also for the end of the clamping screw.

Provision has been made in the present invention for more accurately adjusting the adjustment yoke by providing dial indications on the adjustment nut to cooperate with an index.

In the prior art in order to tighten the screws for holding the thrust bearings endwise on the rolling mill roll, it has been necessary to open up the lubrication cavity around the thrust bearings, thus exposing the interior to dust and necessitating partial or complete relubrication. In accordance with the present invention the cap which holds the thrust bearings in place is accessible outside the lubrication cavity of the thrust bearings, as by providing a grease seal engaging the outside of the cap.

The rolling mill to which the invention may be applied will be any suitable metal rolling mill, of the character employed for hot or cold working of steel, copper base alloys, aluminum base alloys or magnesium base alloys as well known.

While the invention is applicable to two-high rolling mills, three-high rolling mills or other suitable forms, it is shown applied to a two-high mill. The mill has a frame 20 at each end consisting of spaced uprights 21. On the insides of the uprights are guiding walls 22 which receive and guide upper roll upper chuck 23 which forms the upper journal of upper roll 24 and lower roll lower chuck 25 which forms the lower journal of lower roll 26.

The intermediate spacing chucks may be of any suitable character, of which Figure 3 illustrates one form, consisting of upper roll lower chuck 27 having bearing bronze 28 held in place by lugs 30 and lower roll upper chuck 31 having bearing bronze 32 held in place by lugs 33.

The adjoining surfaces of the chucks 27 and 31 at the front and rear are tapered at 34 to receive adjustment wedges 35. The wedges have spring wells 36 provided with spring engaging shoulders 37 which receive the inner ends of spiral compression springs 38. The springs are adjusted by nuts 40 on adjusting screws 41 turning in thrust journals 42. The screws are conveniently built up of components as shown in Figure 3. The nuts are squared to engage against squared walls of the well to prevent turning. The screws have wrench holds 43 at the outer ends.

At the ends of the rolls at which end roll adjustment is to be made, the frames 20 carry brackets 44 which suitably consist of feet 45, bolted to the frames as by bolts 46 and spaced U-shaped arms 47 extending out and across the ends of the rolls, providing suitably horizontally extending slots 48 opposite the ends of the rolls. The respective arms 47 are cross connected across the ends of the rolls by bridges 50, which are suitably plates secured to the arms as by bolts 51. In addition to the bolts 46 for anchoring the brackets, they are accurately located by dowels 52 extending from the feet into the frame.

On the end of the roll beyond the rotational journalled portion 53 in the direction away from the active face of the roll, the roll is provided with a suitably integral cylindrical thrust bearing portion 54 axial with respect to the roll. The thrust bearing portion receives a thrust bearing assembly 55 of any well known type. In the form shown the thrust bearing assembly consists of an inner sleeve 56 which surrounds and engages the portion 54 of the roll and has at its inner end a flange 57 engaging the shoulder end of roll journal portion 53 and provided with dirt, water and scale flingers. The inner race 58 of ball thrust bearing 60 surrounds the sleeve 56, engaging at the end toward the working face of the roll on shoulder 61. The inner race 62 of ball thrust bearing 63 also surrounds the sleeve 56 and adjoins inner race 58. The inner races are locked in place by flange 64 of locking cap 65 which is secured to the end of the roll by bolts 66.

At the outside, thrust bearing 60 has outer race 67 and thrust bearing 63 has outer race 68. These outer races fit within bearing casing 70 which has at the outer end a flange 71 which extends inward and makes a lubrication closure at the outer end of the thrust bearings and holds dust and lubrication seal 72 at the inside of the circular opening in the flange to seal against the outside of circular clamping cap 65.

At the inner end of the thrust bearing assembly, a housing inner flange 73 is provided which is suitably fastened to the housing 70 and has cooperating flinger rings 74 on its inner face. Flange 73 at the inside holds lubrication and dust seal 73' engaging on the outside of sleeve 56.

A supplemental dust closer 75 is provided at the outer end of the thrust bearing assembly, being removably fastened to the housing 70. The housing 70 has a radially outwardly extending projection or flange 76 which cooperates with an adjustment yoke 77. The adjustment yoke has a central body 78 extending between the end of the thrust bearing assembly and the bridge 50 and has ends 80 which hook around at 81 between the thrust bearing assembly flange 76 and the active face of the roll. Mounted on the hook ends 81 are anvil supports 82 suitably socketing in the hook ends and carrying ball ends 83 suitably integral with the supports which make ball and socket universal joint connection with ball socket anvils 85 which engage the flange 76. The anvils are opposed by clamping screws 86 which suitably thread through the yokes and have ball and socket pressure ends 87 on the same axes as the anvils. A ball end 88 on the clamping screw engages in a ball socket 90 on the screw end 87. Locking nuts are provided at 91 to hold the screws in any adjusted position.

The yoke carries rigidly mounted thereon an adjustment stud 92 which goes through an opening 93 in the center of the bridge 50. The stud is suitably threaded into the yoke at 94 and welded at 95.

The stud carries an inner adjustment nut 96 and an outer adjustment nut 97 threaded on the stud and engaging the inner and outer sides of the bridge. The adjustment nuts have capstan openings to receive lever bars. The outer adjustment nuts 97 have dial graduations 98 which preferably correspond to thousandths of an inch and cooperate with an index 100.

In operation, once the mill is set up, the thrust bearing assembly will be mounted on the outer end of each roll as shown and the clamping screws will be tightened against the clamping anvil on opposite sides of the yoke to grip the thrust bearing assembly. Advantage will be taken of the universal joint mounting of the anvil and also of the end of the screw to accurately align the yoke with respect to the adjustment and prevent any tendency of the yoke to bind during adjustment.

At any time that it is desired to check or correct the tightness of mounting of the thrust bearings on the end of the roll, this can be done by simply removing the dust cover 75 and working on the bolts 66, without the necessity of relubricating the thrust bearings. The lubrication such as grease applied to the thrust bearings is retained inside the lubrication space defined by the lubrication seals at the opposite ends, and should not cause lubricant to enter the space immediately inside of the dust seal 75.

The adjustment yoke will of course be taken off when access to the bolts 66 is desired.

When it is desired to change the adjustment of the assembled mechanism, it is merely necessary to release the pressure between adjustment nuts 96 and 97, after which the nut 97 can be moved to the desired distance in either direction as indicated by the scale, and, when it is fully adjusted, the nut 96 can be tightened against the opposite side of the bridge to lock the adjustment. Any shift of axis is taken care of by the ball and socket mounting of the ends of the clamps from the yokes 77 to the thrust bearing assembly. It will be understood of course that there is sufficient freedom in the journal bearings to provide for any end roll adjustment required.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In an end roll adjustment for a rolling mill, a frame, a roll journalled in the frame, a thrust bearing assembly on one end of the roll having opposed surfaces at either side of the assembly directed oppositely with respect to the roll axis, spaced brackets having an intermediate slot secured to the frame and extending over the end of the thrust bearing assembly, an adjustment yoke extending into the slot on either side of the thrust bearing assembly, ball and socket anvils on the adjustment yoke engaging said surfaces of the assembly at the side toward the active portion of the roll, clamping screws on the adjustment yoke engaging said surfaces of the thrust bearing assembly at the side remote from the active face of the roll and gripping the thrust bearing assembly against the anvils and adjustable means for moving the adjustment yoke in and out with respect to the brackets.

2. In an end roll adjustment for a rolling mill, a frame, a roll journalled in the frame and having a portion extending endwise beyond the frame away from the active face of the roll, a thrust bearing assembly secured to the end portion of the roll, bracket means secured to the frame supporting a bridge beyond the end of the roll with respect to the active face of the roll, an adjustment yoke extending around the end of the roll and the thrust bearing assembly and having hook ends which extend inwardly at the side of the thrust bearing assembly toward the active face of the roll, universally swingable clamping anvils on the hook ends engaging the thrust bearing assembly, clamping screws on the adjustment yoke gripping the thrust bearing assembly against the anvils and an adjustment screw adjustably positioning the yoke from the bridge.

3. In an end roll adjustment for a rolling mill, a frame, a roll journalled in the frame and having a portion extending endwise beyond the frame away from the active face of the roll, a thrust bearing assembly secured to the end portion of the roll, bracket means secured to the frame supporting a bridge beyond the end of the roll with respect to the active face of the roll, an adjustment yoke extending around the end of the roll and the thrust bearing assembly and having hook ends which extend inwardly at the side of the thrust bearing assembly toward the active face of the roll, universally swingable clamping anvils on the hook ends engaging the thrust bearing assembly, clamping screws on the adjustment yoke gripping the thrust bearing assembly against the anvils and having universally swingable ends, and an adjustment screw adjustably positioning the yoke from the bridge.

4. In an end roll adjustment, a frame, a rolling mill roll journalled in the frame, a thrust bearing assembly secured to the end of the rolling mill roll, bracket means secured to the frame including a bridge extending across the end of the rolling mill roll beyond the thrust bearing assembly, an adjustment yoke extending around the thrust bearing assembly between the bridge and the end of the roll, opposed anvils and clamping screws clamping the adjustment yoke to the thrust bearing assembly, a threaded stub shaft from the adjustment yoke extending through an opening in the bridge, nuts on the stub shaft one of which has dial indications and an index on the bridge cooperating with the dial indications.

5. In an end roll adjustment for rolling mill roll, a thrust bearing assembly on one end of the roll, having downwardly extending projections, universally swingable anvils gripping the projections, a yoke extending around the end of the thrust bearing assembly on two sides thereof supporting the anvils and means secured to the yoke for adjusting the yoke endwise.

References Cited in the file of this patent

UNITED STATES PATENTS

| Number | Name | Date |
|---|---|---|
| 1,020,064 | Wackermann | Mar. 12, 1912 |
| 2,175,783 | Rose | Oct. 10, 1939 |
| 2,178,628 | Duda | Nov. 7, 1939 |
| 2,335,800 | Sheperdson | Nov. 30, 1943 |

FOREIGN PATENTS

| Number | Country | Date |
|---|---|---|
| 636,616 | Great Britain | May 3, 1950 |